United States Patent [19]

Tsai

[11] Patent Number: 5,695,246
[45] Date of Patent: Dec. 9, 1997

[54] SEAT DEVICE ATTACHED TO BAGGAGE HANDCART

[76] Inventor: Chin Ho Tsai, No. 113, Lane 60, Gong Jiaw Street, Tali City, Taichung Hsien, Taiwan

[21] Appl. No.: 748,411

[22] Filed: Nov. 13, 1996

[51] Int. Cl.⁶ .............. A47C 1/06; B62B 1/00; B62B 1/26
[52] U.S. Cl. .............. 297/335; 297/217.1; 297/16.1; 297/344.18; 280/47.25
[58] Field of Search .............. 297/335, 217.1, 297/337, 31, 16.1, 344.18; 280/47.25, DIG. 6

[56] References Cited

U.S. PATENT DOCUMENTS

| | | | |
|---|---|---|---|
| 2,442,620 | 6/1948 | Simpson | 280/47.25 X |
| 3,093,412 | 6/1963 | Gore et al. | 297/217.1 |
| 3,506,280 | 4/1970 | Leupe | 297/217.1 X |
| 3,726,536 | 4/1973 | Ariño | 280/47.25 X |
| 3,738,600 | 6/1973 | Harper | 280/47.25 X |
| 4,323,260 | 4/1982 | Suchy | 280/47.25 |
| 4,632,457 | 12/1986 | Hofrichter et al. | 297/335 |
| 4,659,142 | 4/1987 | Kuchinsky, Jr. | 280/47.25 X |
| 4,733,905 | 3/1988 | Buickerood et al. | 280/47.25 X |
| 4,824,167 | 4/1989 | King | 297/217.1 X |
| 4,846,486 | 7/1989 | Hobson | 280/47.25 |
| 4,988,117 | 1/1991 | Shortall | 280/47.25 X |
| 5,290,049 | 3/1994 | Crisp et al. | 297/217.1 X |
| 5,362,079 | 11/1994 | Graham | 297/217.1 X |
| 5,364,120 | 11/1994 | Shimansky | 280/47.25 X |
| 5,507,508 | 4/1996 | Liang | 297/217.1 X |
| 5,516,197 | 5/1996 | Condos | 297/344.18 |
| 5,536,068 | 7/1996 | Valentor et al. | 297/344.18 |
| 5,547,205 | 8/1996 | do Rosario Sousa de Cabedo | 297/250.1 X |

FOREIGN PATENT DOCUMENTS

| | | | |
|---|---|---|---|
| 226399 | 3/1963 | Austria | 280/47.25 |
| 795330 | 3/1936 | France | 280/47.25 |
| 2053812 | 2/1981 | United Kingdom | 280/47.25 |

Primary Examiner—Peter M. Cuomo
Assistant Examiner—Rodney B. White
Attorney, Agent, or Firm—Charles E. Baxley Esq.

[57] ABSTRACT

A seat device attached to a baggage handcart includes a base attached to the baggage handcart with two rear legs disposed perpendicularly thereto, the base having two frames extending therefrom for a seat plate pivotally engaged thereto which has two first receiving members and a second member disposed to a bottom, a front leg pivotally disposed to a front end of the seat plate, the front leg having a passage defined by a non-circular periphery so as to respectively receive a block and a rod therein, the block having a slit defined therein for receiving an eccentric protrusion extending from the rod such that when the rod rotated to let the protrusion be located in the slit, the block is expanded to securely contact the non-circular periphery of the passage.

4 Claims, 4 Drawing Sheets

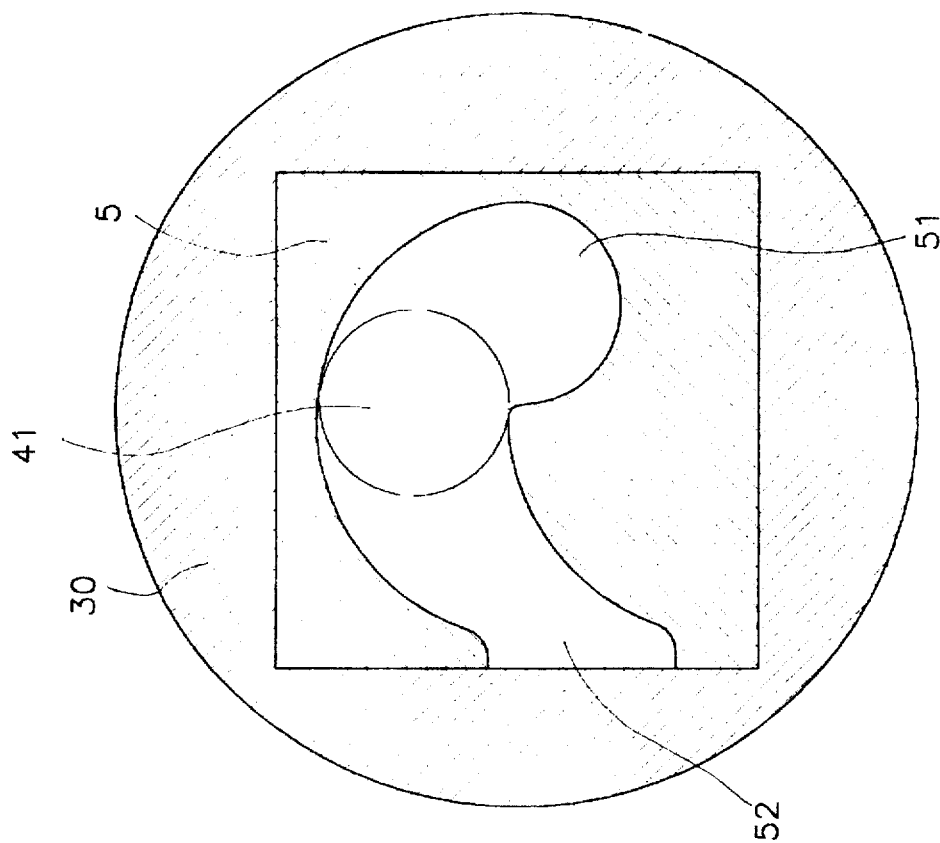
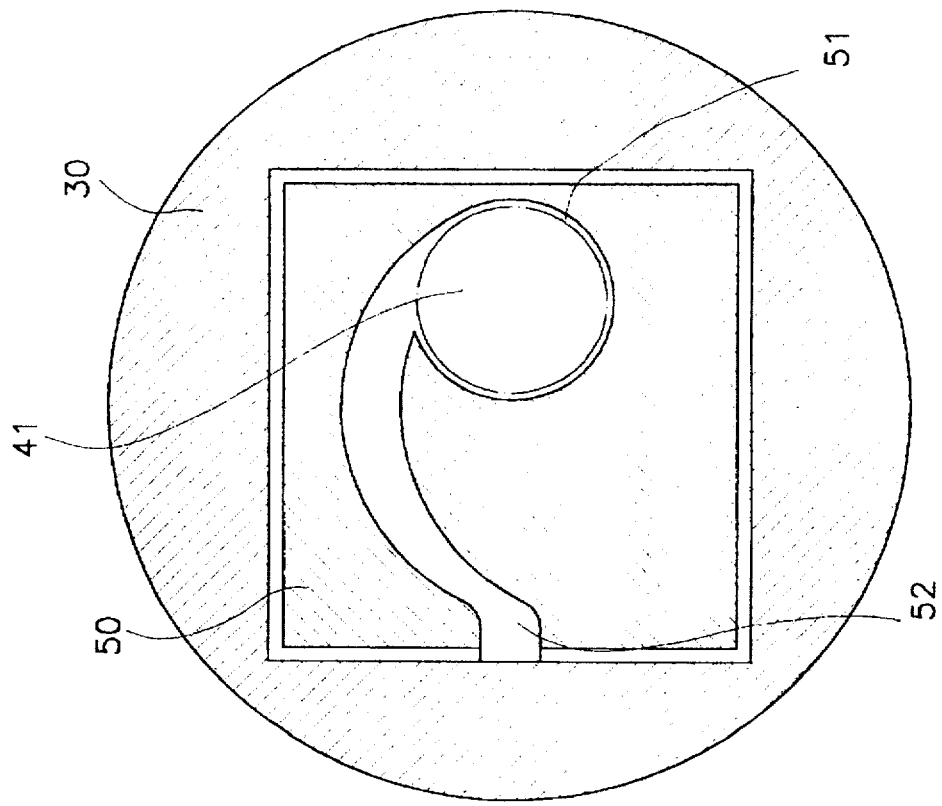

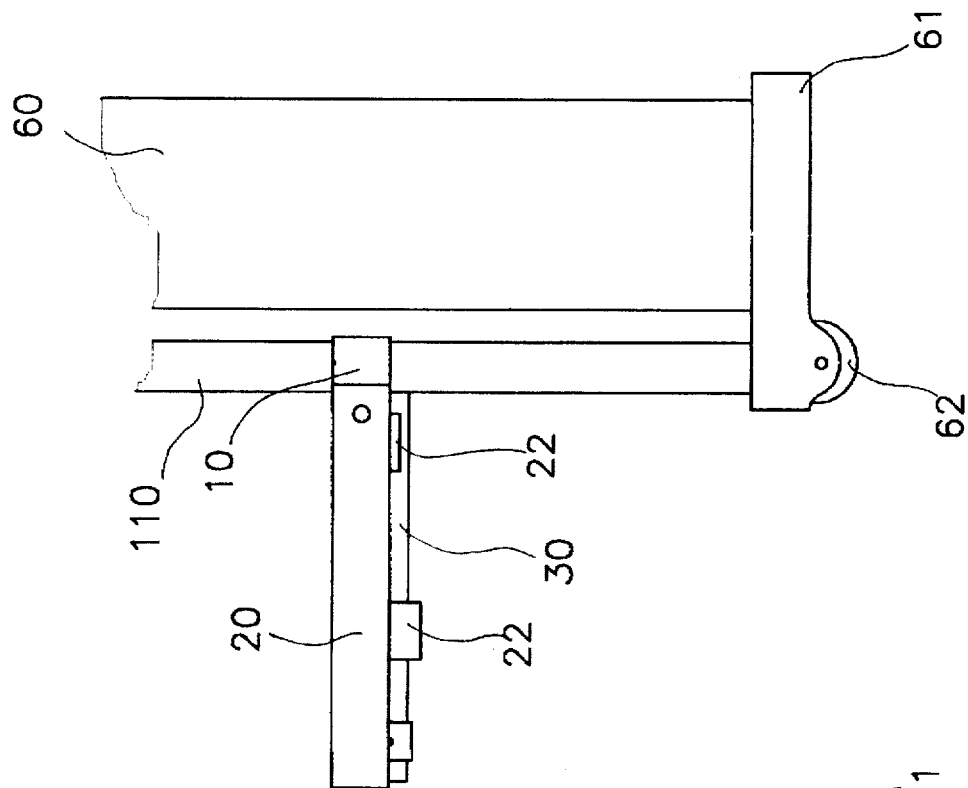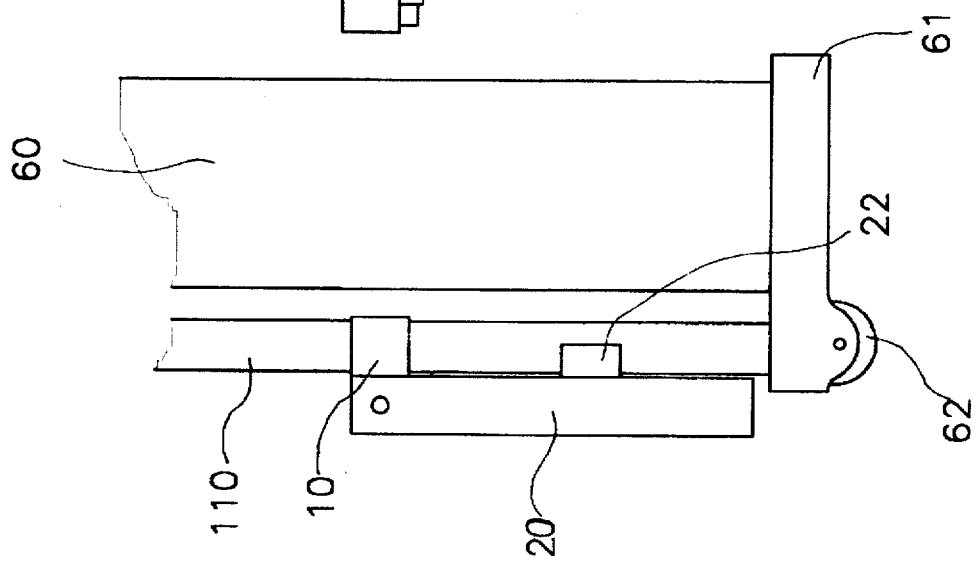

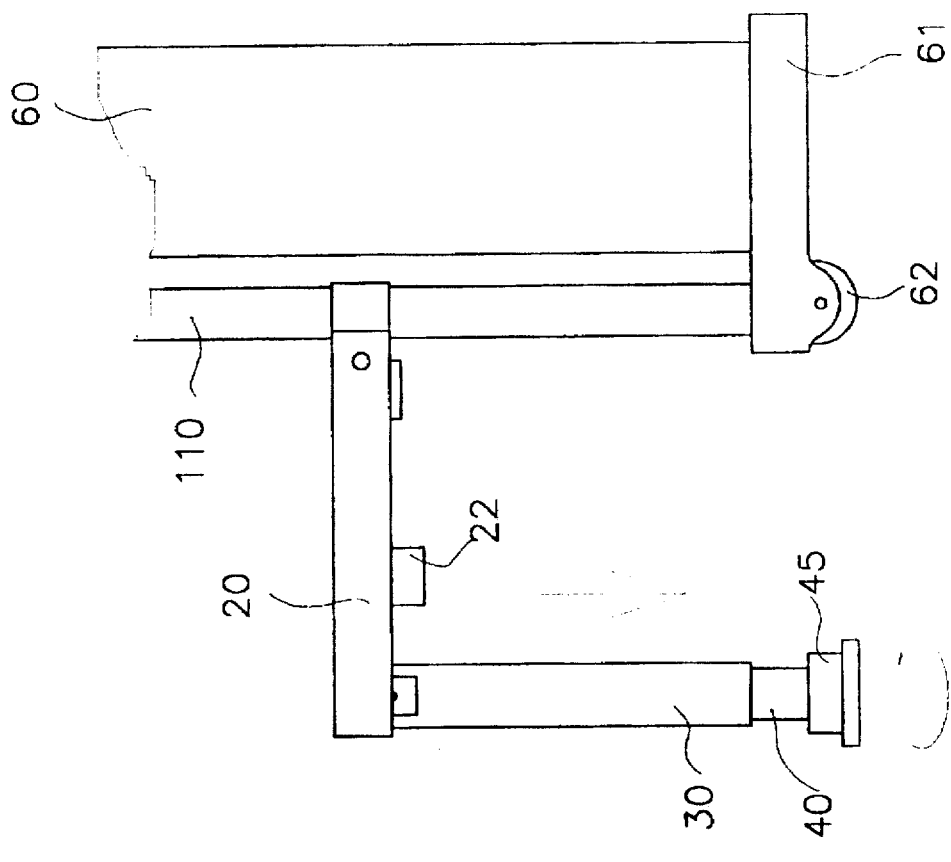
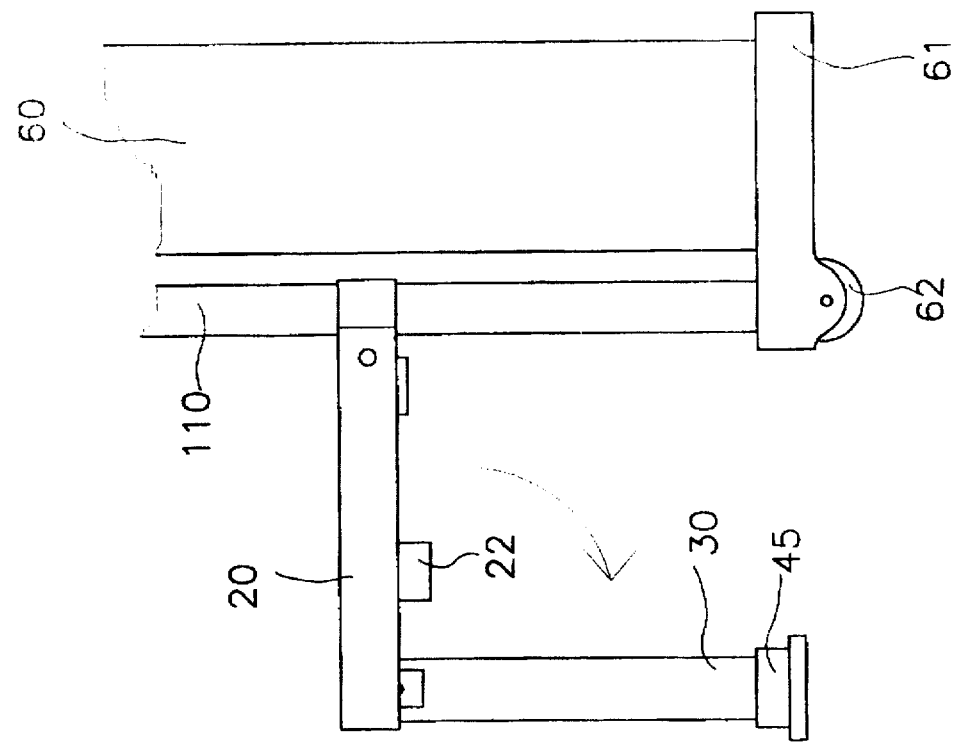

SEAT DEVICE ATTACHED TO BAGGAGE HANDCART

BACKGROUND OF THE INVENTION

1. Field of the Invention

The present invention relates to a seat device and more particularly, to a foldable seat device attached to a baggage handcart such that a user can sit on the seat device when in airport with his/her baggage.

2. Brief Description of the Prior Art

Travelers spend so much time in airports, rail stations or other traffic stops, especially in certain seasons, there are always too many travelers in airports or stations share limited amount of seats. Therefore, many travelers sit on his/her baggage and this could wrinkle clothes or damage goods in the baggage. A prior patent entitled as "Tractive Baggage Handcart", issued Dec. 20, 1994 by Hsieh Hung-Hsin is known to Applicant. In the prior patent, a seat platform can be extended horizontally and supported in a middle portion of the bottom thereof. However, such a seat platform has a limited area for a user to sit thereon, that is to say, a center of weight of the user will be located near a front edge of the platform and a large moment will be exerted about a center of the seat platform.

The present invention intends to provide an improved seat device attached to a baggage handcart to mitigate and/or obviate the above-mentioned problems.

SUMMARY OF THE INVENTION

The present invention provides a seat device attached to a baggage handcart and comprises a base having two first passages defined perpendicularly therethrough for receiving two rear legs therein. The base has two frames extending transversely therefrom so as to pivotally connect a seat plate having a front end and a rear end. Two lugs extend downwardly from a bottom of the front end so as to pivotally connect to a front leg, two first receiving members disposed to both sides of the bottom of the seat plate and a second receiving member disposed to the rear end of the bottom of the seat plate.

The front leg has a first end pivotally connected between the two lugs and a second passage is defined longitudinally therein which has a non-circular inner periphery defining the second passage and accesses to a second end of the front leg.

A flexible block is received in the second passage and has a slit defined therein which communicates with a periphery of the block, a receiving hole defined in the block and communicating with the slit. A rod is retractably received in the second passage and has a first end and a second end, the second end of the rod having an eccentric protrusion extending therefrom and the protrusion having a head formed on a distal end thereof wherein the protrusion is movably received in the slit and has a diameter the same as that of the hole of the block such that the rod is securely positioned in the second passage by rotating the rod to let the protrusion located in the slit so as to expand the block to be securely positioned in the second passage.

It is an object of the present invention to provide a foldable seat attached to a baggage handcart.

It is another object of the present invention to provide a seat device which has a front leg which is positioned by rotating a rod received in the front leg.

It is a further object of the present invention to provide a seat device wherein the front leg thereof is cooperated with a block received in the front leg to position the rod.

Other objects, advantages, and novel features of the invention will become more apparent from the following detailed description when taken in conjunction with the accompanying drawings.

BRIEF DESCRIPTION OF THE DRAWINGS

FIG. 2 is an illustrative view to show an engagement of the block and the front leg wherein the protrusion is received in the hole of the block;

FIG. 3 is an illustrative view to show an engagement of the block and the front leg wherein the protrusion is moved to a location in the slit of the block;

FIG. 4 is a side elevational view of the seat device which is attached to a baggage handcart:

FIG. 5 is a side elevational view to show a seat plate of the seat device is pivoted to a horizontal position;

FIG. 6 is a side elevational view to show the front leg of the seat device is pivoted to a vertical position, and FIG. 7 is a side elevational view to show a rod is pulled from the front leg of the seat device and positioned by rotating at an angle.

DETAILED DESCRIPTION OF THE PREFERRED EMBODIMENT

Figure 1:
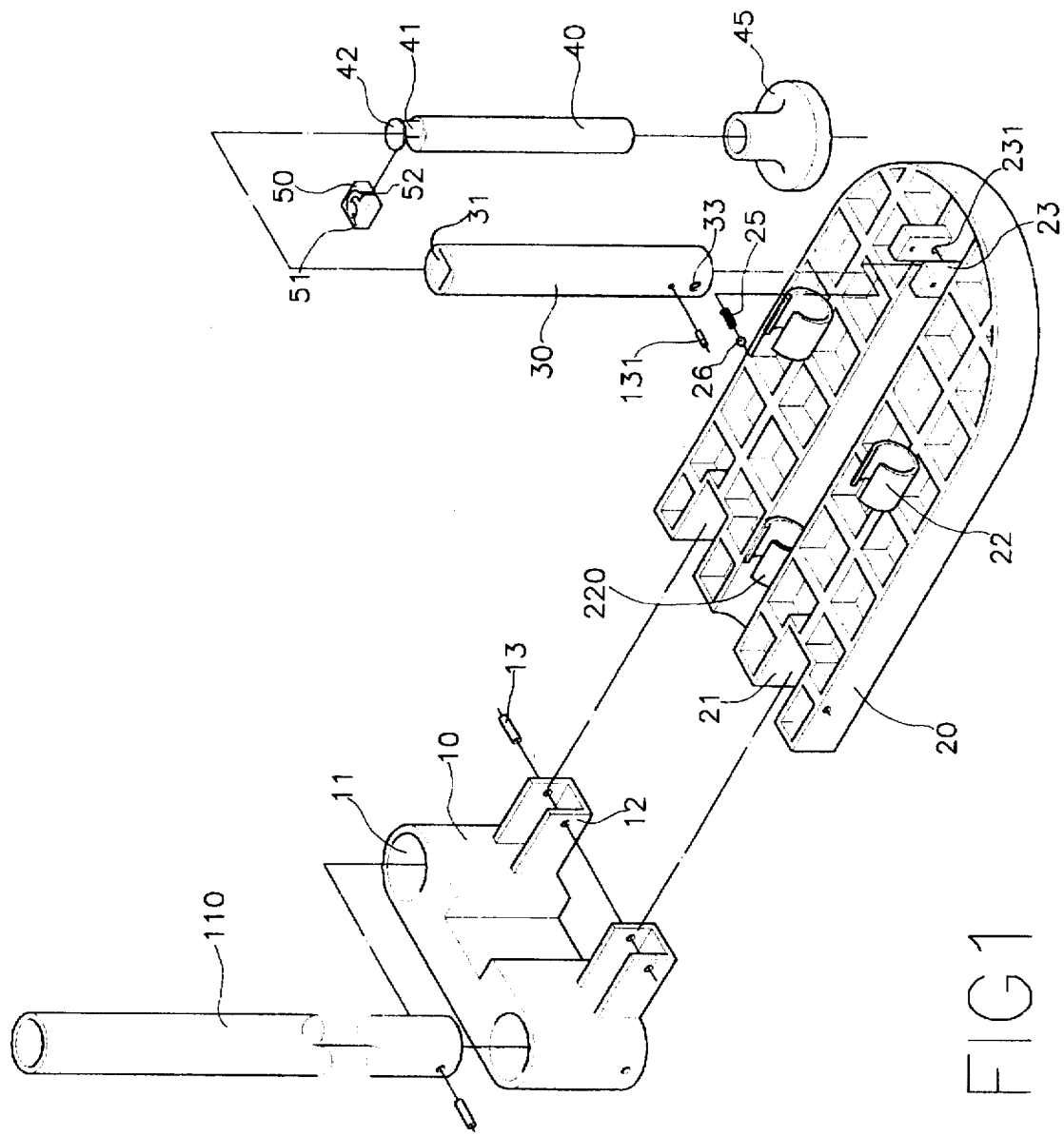
FIG. 1 is an exploded view of the seat device in accordance with the present invention.

Referring to the drawings and initially to FIGS. 1 and 4, a seat device in accordance with the present invention generally includes a base 10 which is attached to a baggage handcart 60 and includes two ends, each of the ends having a first passage 11 defined perpendicularly therethrough and two rear legs 110 respectively and securely extending through the two first passages 11. Generally, each of the two rear legs 110 has a retractable handle assembly received therein and the two rear legs 110 connected to a bottom frame 61 of the baggage handcart 60 with two wheels 62 disposed to a bottom of the bottom frame 61. The base 10 of the seat device has two frames 12 respectively extending transversely from each one of the two ends thereof.

A seat plate 20 has a front end and a rear end, the rear end having two recesses 21 defined therein so as to respectively and pivotally receive the frame 12 therein by a pin 13. Two lugs 23 respectively extend downwardly from a bottom of the front end of the seat plate 20, two C-shaped first receiving members 22 disposed to both sides of the bottom of the seat plate 20 and a C-shaped second receiving member 220 disposed to the rear end of the bottom of the seat plate 20.

A front leg 30 has a first end pivotally connected between the two lugs 23 by a pin 131 and a second passage 31 is defined longitudinally therein which has a non-circular inner periphery defining the second passage 31 and accesses to a second end of the front leg 30. The front leg 30 has a dimple 33 defined in an outer periphery thereof and one of the lugs 23 has a spring 25 and ball 26 biasedly received in a receiving recess 231 defined in an inner surface thereof such that the ball 26 is received in the dimple 33 when the front leg 30 is pivoted to a vertical position corresponding to the seat plate 20.

A flexible block 50 having the same configuration as that of the non-circular inner periphery defining the second passage 31 is received in the second passage 31 and has a slit 52 defined therein which communicates with a periphery of the block 50. A receiving hole 51 is defined in the block 50 and communicates with the slit 52.

A rod 40 is retractably received in the second passage 31 and has a first end and a second end. The first end of the rod 40 is connected to an enlarged support 45 and the second end of the rod 40 has an eccentric protrusion 41 extending therefrom. The protrusion 41 has a head 42 formed on a distal end thereof wherein the protrusion 41 has a diameter larger than a width of the slit 52 and the same as a diameter of the hole 51 and, the head 42 has a larger diameter than the hole 51. Accordingly, referring to FIGS. 2 and 3, when the rod 40 is received in the hole 51, the block 50 is slidable in the second passage 31 and when the rod 40 is moved in the slit 52, the slit 52 will be expanded to expand the block 50 to securely contact the non-circular inner periphery of the second passage 31.

Referring to FIG. 4 again, the two rear legs 110 are respectively received in the first receiving members 22 and the front leg 30 is received in the second receiving member 220 when the seat plate is pivoted to an unused position. Referring to FIGS. 5 through 7, when using the seat device, the seat plate 20 is firstly pivoted to a horizontal position and then the front leg 30 is pulled to a vertical position as shown in FIG. 6. The rod 40 is pulled downwardly to a desired position and is rotated at an angle to let the rod 40 moved from the hole 51 to the slit 52 to expand the block 50 to securely contact the non-circular inner periphery such that the rod 40 is positioned.

Therefore, the seat device is easily to be operated and provides a convenient feature for a user.

Although the invention has been explained in relation to its preferred embodiment, it is to be understood that many other possible modifications and variations can be made without departing from the spirit and scope of the invention as hereinafter claimed.

What is claimed is:

1. A seat device attached to a baggage handcart and comprising:

a base attached to said baggage handcart and including two ends, each of said ends having a first passage defined perpendicularly therethrough and two rear legs respectively and securely extending through said two first passages, two frames each extending transversely from each one of said two ends of said base;

a seat plate having a front end and a rear end, said rear end having two recesses defined therein so as to respectively and pivotally receive said frame therein, two lugs extending downwardly from a bottom of said front end, two first receiving members disposed to both sides of said bottom of said seat plate and a second receiving member disposed to said rear end of said bottom of said seat plate;

a front leg having a first end pivotally connected between said two lugs and a second passage defined longitudinally therein which has a non-circular inner periphery defining said second passage and accessing to a second end of said front leg;

a flexible block received in said second passage and having a slit defined therein which communicates with a periphery of said block, a receiving hole defined in said block and communicating with said slit, and a rod retractably received in said second passage and having a first end and a second end, said second end of said rod having an eccentric protrusion extending therefrom and said protrusion having a head formed on a distal end thereof wherein said protrusion has a diameter larger than a width of the slit and the same as a diameter of said hole and, said head has a larger diameter than said hole.

2. The seat device as claimed in claim 1 wherein said front leg has at least one dimple defined in an outer periphery thereof and at least one of said lugs has a ball biasedly received in an inner surface thereof such that said ball is received in said dimple when said front leg is vertically positioned corresponding to said seat plate.

3. The seat device as claimed in claim 1 wherein said two first receiving members and said second receiving member are C-shaped members such that said two rear legs are respectively received in said first receiving members and said front leg is received in said second receiving member when said seat plate is pivoted to an unused position.

4. The seat device as claimed in claim 1 wherein said block has a configuration the same as that of said non-circular inner periphery of said second passage such that when said rod is rotated to position said protrusion in said slit, said block is expanded to securely contact said non-circular inner periphery of said second passage.

\* \* \* \* \*